(12) United States Patent
Chang et al.

(10) Patent No.: US 9,051,429 B2
(45) Date of Patent: Jun. 9, 2015

(54) POLYAMIC ACID RESIN COMPOSITION AND METHOD FOR FORMING POLYIMIDE RESIN

(75) Inventors: Li-Ming Chang, Hsinchu (TW); Charng-Shing Lu, Hsinchu (TW); Shur-Fen Liu, Hsinchu County (TW); Jinn-Shing King, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 568 days.

(21) Appl. No.: 12/605,787

(22) Filed: Oct. 26, 2009

(65) Prior Publication Data

US 2011/0054124 A1  Mar. 3, 2011

(30) Foreign Application Priority Data

Sep. 1, 2009 (TW) .............................. 98129373 A

(51) Int. Cl.
| | | |
|---|---|---|
| C08K 5/00 | (2006.01) |
| C08G 73/10 | (2006.01) |
| B32B 7/12 | (2006.01) |
| B32B 15/08 | (2006.01) |
| B32B 27/34 | (2006.01) |
| C08L 79/08 | (2006.01) |
| C08K 5/134 | (2006.01) |
| C08K 5/3432 | (2006.01) |
| C08K 5/3437 | (2006.01) |
| C08K 5/3445 | (2006.01) |
| C08K 5/3447 | (2006.01) |
| C08K 5/3492 | (2006.01) |

(52) U.S. Cl.
CPC .............. *C08G 73/1071* (2013.01); *B32B 7/12* (2013.01); *B32B 15/08* (2013.01); *B32B 27/34* (2013.01); *C08G 73/1067* (2013.01); *C08K 5/1345* (2013.01); *C08K 5/3432* (2013.01); *C08K 5/3437* (2013.01); *C08K 5/3445* (2013.01); *C08K 5/3447* (2013.01); *C08K 5/3492* (2013.01); *C08L 79/08* (2013.01); *C08L 2203/20* (2013.01)

(58) Field of Classification Search
USPC .................. 524/606, 291, 736, 738; 528/310; 525/425
See application file for complete search history.

(56) References Cited

U.S. PATENT DOCUMENTS

| | | | | |
|---|---|---|---|---|
| 5,585,217 A | * | 12/1996 | Oba .............................. | 430/191 |
| 5,756,650 A | * | 5/1998 | Kawamonzen et al. ...... | 528/353 |
| 2001/0051707 A1 | * | 12/2001 | Fukuoka et al. .............. | 528/338 |

FOREIGN PATENT DOCUMENTS

| | | |
|---|---|---|
| JP | H09-302225 A | 11/1997 |
| JP | 2008-115377 A | 5/2008 |

* cited by examiner

*Primary Examiner* — Wenwen Cai

(57) ABSTRACT

Additives of a polyamic acid resin composition are disclosed, including an ester-phenol compound, an imidazole compound, and a heterocyclic aromatic amine compound other than the imidazole compound. The high cyclization temperature and long cyclization period of conventional polyamic acid resin compositions can be lowered and shorten by the additives of the invention. In addition, a metal foil and the polyimide resin formed from the cyclization have excellent adhesive strength, high flat degree, and excellent electrical property.

7 Claims, No Drawings

POLYAMIC ACID RESIN COMPOSITION AND METHOD FOR FORMING POLYIMIDE RESIN

CROSS REFERENCE TO RELATED APPLICATIONS

This Application claims priority of Taiwan Patent Application No. 98129373, filed on Sep. 1, 2009, the entirety of which is incorporated by reference herein.

BACKGROUND OF THE INVENTION

1. Field of the Invention

The present invention relates to a polyamic acid resin composition, and in particular an additives type polyamic acid resin composition and molar ratio thereof.

2. Description of the Related Art

Polyimide is widely applied in flexible metal foil substrates of assembly industry due to its excellent thermal resistance, electrical properties, size stability, and softness. Moreover, metal foil substrates may be light-weight, thin, short and small-sized, for application in the electronics industry.

Extrusion coating is a fabrication method conventionally used for fabricating flexible metal foil substrates. The extrusion coating process comprises coating polyamic acid resin on a conductive metal foil, drying the resin to remove organic solvents, and then charging the resin at a high temperature (>350° C.) for a predetermined period of time (>1 hour) under nitrogen for cyclization. Because the cyclization consumes much energy and time, a catalyst, such as one disclosed in JP09302225, may be added to the polyamic acid resin to decrease power consumption and process time. In the process, the polyamic acid is firstly synthesized and then the catalyst is added thereto, wherein the polyamic acid resin and the catalyst have a molar ratio of about 1:2. The catalyst having a pKa value of 0 to 8, comprises substituted or non-substituted nitrogen-contained heterocyclic compounds, substituted or non-substituted amino acid compounds, or phenyl compounds or hetero-aromatic compounds having at least hydroxyl groups and a molecular weight of less than 1000. The polyimide is generally applied in alignment films of LCDs. However, for reducing the cyclization temperature to less than 200° C., the catalyst molar ratio must be two times higher than the polyimide precursor (polyamic acid) molar ratio. Thus, mechanical strength and electrical properties of flexible metal foil substrates fabricating therefrom are reduced due to the high additive amount of the catalyst.

JP2008115377 discloses a nitrogen-contained hetero aromatic compound having at least one imine as a catalyst of a heterocyclic compound. The nitrogen-contained hetero aromatic compound may be a single five or six member ring having at least two nitrogen atoms in the ring, or one nitrogen atom in a single six member ring is replaced with another substitute group. A polyimide resin layer comprising the catalyst, has a reduced thermal expansion coefficient of 15 to 20 ppm/K. However, the catalyst molar ratio is still required to be equal to the polyamic acid resin molar ratio for cyclization in 10 minutes. As such, high amounts of the catalyst reduce the electrical properties of the polyimide resin layer, such that products therefrom may not be applied in printed circuit substrates.

Accordingly, a low amount of proper additives is called-for that may simultaneously decrease cyclization temperature and process period of the polyamic acid, while retaining the physical properties of the polyimide product.

BRIEF SUMMARY OF THE INVENTION

A detailed description is given in the following embodiments with reference to the accompanying drawings.

The invention provides a polyamic acid resin composition, comprising a polyamic acid resin and an additive, wherein the additive comprises an ester-phenol compound, an imidazole compound, and a heterocyclic aromatic amine compound other than the imidazole compound.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Firstly, equal molar ratios of tetracarboxylic anhydride and diamine monomers are reacted to form a polyamic acid resin as shown in Formula 1.

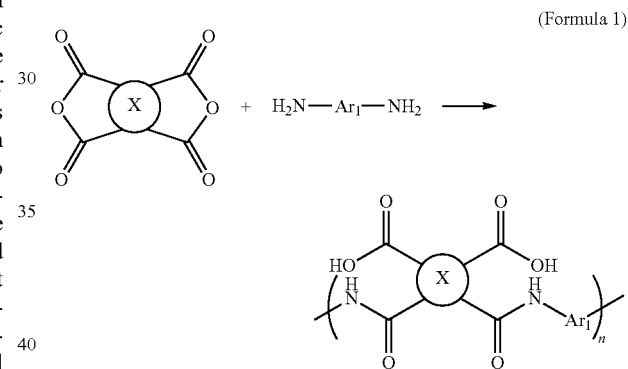

(Formula 1)

In Formula 1, the X of the polyamic acid resin is determined by the core of the tetracarboxylic anhydride as shown in Formulae 2-5. Alternatively, the $Ar_1$ of the polyamic acid resin is determined by the backbone of the diamine as shown in Formulae 6-14. Moreover, n is between 50 to 3000.

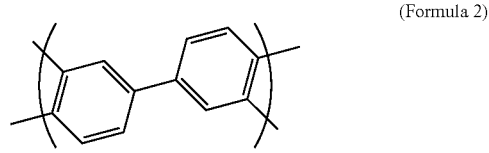

(Formula 2)

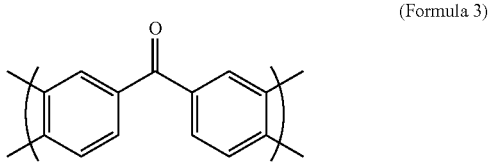

(Formula 3)

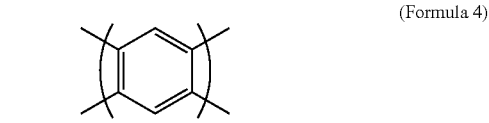

(Formula 4)

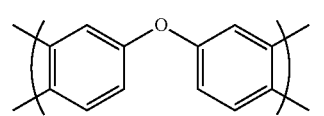
(Formula 5)

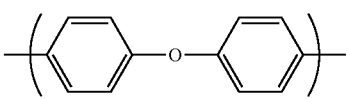
(Formula 6)

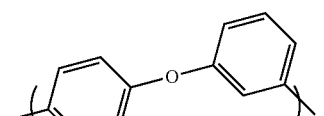
(Formula 7)

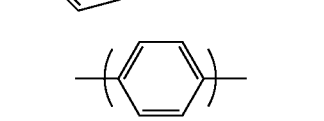
(Formula 8)

(Formula 9)

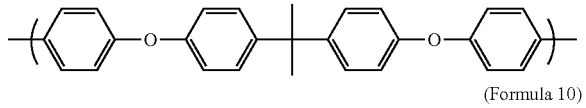
(Formula 10)

(Formula 11)

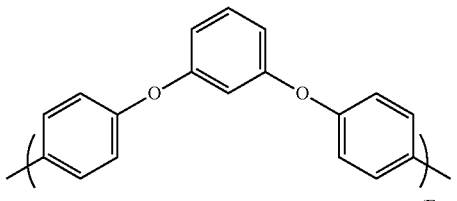
(Formula 12)

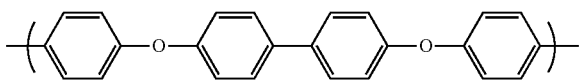
(Formula 13)

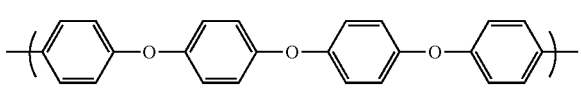
(Formula 14)

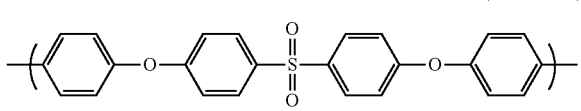

To improve film properties and cyclization, the core X of the tetracarboxylic anhydride and the backbone $Ar_1$ of the diamine are aromatic rings. Corresponding to X in Formulae 2-5, suitable tetracarboxylic anhydrides for the invention include 3,3',4,4'-biphenyltetracarboxylic dianhydride (abbreviate BPDA), benzophenone-3,3',4,4'-tetracarboxylic dianhydride (abbreviate BTDA), pyromellitic dianhydride (abbreviate PMDA), 4,4'-oxydiphthalic anhydride (abbreviate OPDA), other suitable tetracarboxylic anhydrides, or combinations thereof. Corresponding to $Ar_1$ in Formulae 6-14, suitable diamine for the invention includes 4,4'-oxydianiline (abbreviate 4,4'-ODA), 3,4'-oxydianiline (abbreviate 3,4'-ODA), 1,4-Phenylenediamine (abbreviate p-PDA), 2,2-bis(4-[aminophenoxyl]phenyl)propane (abbreviate BAPP), 1,4-bis(4-aminophenoxy)benzene (abbreviate TPE-Q), 1,3-bis(4-aminophenoxy)benzene (abbreviate TPE-R), 4,4'-bis(4-aminophenoxy)-biphenyl (abbreviate BAPB), or bis(4-[4-aminophenoxy]phenyl)ether (abbreviate BAPE), 2,2-bis(4-[4-aminophenoxy]phenyl)sulfone (abbreviate BAPS).

Subsequently, three additives such as an ester-phenol compound, an imidazole compound, and a heterocyclic aromatic amine compound other than the imidazole compound were added to the polyamic acid resin, and then coated on a flexible metal foil, as shown in Formula 15. After baked for 20 to 40 minutes at a temperature of 280 to 320° C., the polyamic acid resin may be completely cyclized to form a polyimide resin (abbreviate PI). The PI resin serves as an insulation layer that is to be combined with a flexible metal foil to constitute a flexible substrate. In one embodiment, the polyamic acid and the additives have a molar ratio of 1:0.1 to 1:0.5. If the amount of additives is insufficient, the cyclization temperature and the period of the polyamic acid resin cannot be decreased. If the amount of additives is overdose, the mechanical and the electrical properties of the polyimide resin may be reduced. Compared to conventional methods, the additives of the invention may decrease temperature (<350° C.) and processing time period (<60 minutes) for cyclizing the polyamic acid resin. In addition, the lower amount of additives in the invention benefits the properties of the cyclized polyimide resin layer, e.g. adhesive strength properties between the polyimide resin layer and the metal foil, and high flat degree and good electrical properties of the polyimide resin layer.

(Formula 15)

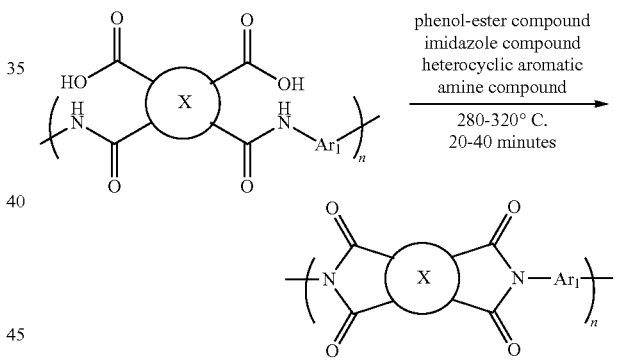

The described phenol-ester compound can be benzyl 4-Hydroxybenzoate, methyl 2,4-dihydroxybenzoate, methyl 2,5-dihydroxybenzoate, methyl 2,6-dihydroxybenzoate, methyl 3,4,5-tihydroxybenzoate, methyl 3,5-dihydroxybenzoate, methyl 3-hydroxybenzoate, methyl 4-hydroxybenzoate, benzyl salicylate, methyl salicylate, other suitable phenol-ester compounds, or combinations thereof. The ester-phenol compound of proper amount may reduce the cyclization temperature and period of time needed for cyclizing the polyamic acid resin. Additionally, adhesive strength between the polyimide and the metal foil may be enhanced. In one embodiment, the polyamic acid resin and the phenol-ester compound have a molar ratio of 1:0.01 to 1:0.48. If the amount of the phenol-ester compound is insufficient, the cyclization temperature and the period of the polyamic acid resin cannot be decreased, thereby degrading the adhesive strength of the polyimide resin layer and the metal foil. If the amount of the phenol-ester compound is overdose, the mechanical and the electrical properties of the polyimide resin may be reduced and flat degree of the polyimide resin will be decreased.

The described imidazole compound can be imidazole, benzimidazole, 1,2,4-triazole, 1,2,3,4-tetrahydrocarbazole, 2-hydroxybenzimidazole, 1H-1,2,3-triazole, 1H-benzotriazole, 2-(2-hydroxyphenyl)1H-benzimidazole, 2-(2-pyridyl)benzimidazole, 2-(3-pyridyl)1H-benzimidazole, other suitable imidazoles, or combinations thereof. Utilizing an appropriate amount of an imidazole compound may reduce the cyclization temperature and process time required for cyclizing the polyamic acid. In one embodiment, the polyamic acid resin and the imidazole compound have a molar ratio of 1:0.01 to 1:0.48. If the amount of the imidazole compound is insufficient, the cyclization temperature and the period of the polyamic acid resin cannot be decreased. If the amount of the imidazole compound is overdose, the mechanical and the electrical properties of the polyimide resin may be reduced.

The described heterocyclic aromatic amine compound (other than the imidazole compound) can be 2,2'-dipyridyl, 4,4'-dipyridyl, isoquinoline, quinoline, phenanthridine, phthalazine, 1,10-phenanthroline, 4,7-Phenanthroline, 1,7-Phenanthroline, hexahydro-1,3,5-triphenyl-1,3,5-triazine, benzo(f)quinolineother suitable heterocyclic aromatic amine compound, or combinations thereof. Utilizing an appropriate amount of a heterocyclic aromatic amine compound may reduce the cyclization temperature and process time required for cyclizing the polyamic acid and enhance the flat degree of the polyimide resin layer. In one embodiment, the polyamic acid resin and the heterocyclic aromatic amine compound have a molar ratio of 1:0.01 to 1:0.48. If the amount of the heterocyclic aromatic amine compound is insufficient, the cyclization temperature and the period of the polyamic acid resin cannot be decreased and the polymide acid resin will warp. If the amount of the heterocyclic aromatic compound is overdose, the mechanical and the electrical properties of the polyimide resin may be reduced and the adhesive strength between the polyimide resin layer and the metal foil will also be reduced.

EXAMPLES

The measurements and evaluations of material properties:

In the flexible laminate substrates of the invention, the adhesive strength between the polyimide resin layer and the copper foil was measured according to the IPC-TM-650 (2.4.9) standard.

The dielectric constant of the polyimide resin layers was measured according to the ASTM-150 (1 MHz) standard.

The flat degree of the flexible laminate substrates was evaluated as below. First, the flexible metal laminate plate was cut to A4 size. The cut plate was etched to remove metal foil, and the remaining polyimide film was hung on the wall. The right and left sides of the top part in the polyimide film were pressed on the wall by a ruler. The right and left sides of the bottom part in the polyimide film warped from the wall, wherein the warped degree was measured by a vernier caliper. For example, the right side of the bottom part was warped by a distance L1 from wall, and the left side of the bottom part was warped by a distance L2 from wall, wherein the warped degree of the polyimide film was (L1+L2)/2. (L1+L2)/2<5 mm means the warped degree represented an excellent flat degree, 5 mm<(L1+L2)/2<10 mm means the warped degree represented a good flat degree, and (L1+L2)/2>10 mm means the warped degree represented a poor flat degree (warped and deformed state).

Example 1

8.2926 g of 1,4-Phenylenediamine (hereinafter p-PDA, 7.678 mmole) and 2.71 g of 4,4'-Oxydianiline (hereinafter 4,4'-ODA, 1.355 mmole) were charged in a 500 mL four neck reaction bottle, added 212.5 mL of N-methylpyrrolidine/toluene co-solvent in 80/20 volume ratio, purged by nitrogen, and then stirred to totally dissolve the diamine monomers. Thereafter, 5.2357 g of benzophenone-3,3',4,4'-tetracarboxylic dianhydride (hereinafter BTDA, 1.626 mmole) was added to the described diamine solution to react for 30 minutes at room temperature, and then added 21.2616 g of 3,3',4,4'-Biphenyltetracarboxylic dianhydride (hereinafter BPDA, 7.226 mmole). After stirred and reacted for 3 hours, the polyamic acid resin solution A was obtained.

0.2093 g of benzyl 4-hydroxybenzoate (hereinafter b4hb, 0.0917 mmole), 0.4122 g of imidazole (hereinafter imd, 0.6 mmole), and 0.4727 g of 4,4'-dipyridyl (hereinafter dpd, 0.3 mmole) pre-dissolved in 3 g NMP as a solution was added to the polyamic acid resin solution A for reaction. After completely stirred for 1 hour, the viscous polyamic acid resin solution B was obtained.

The viscous polyamic acid resin solution B was evenly coated on a copper foil having a thickness of 18 μm, baked for 4 minutes at a temperature of 100° C., then baked for 8 minutes at a temperature of 180° C., and then baked for 20 minutes a temperature of 300° C. to cyclize the polyamic acid resin for forming polyimide resin. A flexible laminate substrate composed of the polyimide resin layer and the copper foil, having a thickness of 25 μm, was completed. The composition and property measurements of the flexible laminate substrate were recorded as shown in Table 1.

Example 2

The polyamic acid resin solution A was prepared in the same manner as that in Example 1. Subsequently, 1.0169 g of b4hb (0.4455 mmole), 1.0313 g of imd (1.5148 mmole), and 1.155 g of dpd (0.7396 mmole) pre-dissolved in 5 g NMP as a solution was added to the polyamic acid solution A for reaction. After being completely stirred for 1 hour, the viscous polyamic acid resin solution C was obtained. The viscous polyamic acid resin solution C was cyclized in the same manner as that in Example 1, thereby forming a polyimide resin layer in a flexible laminate substrate. The composition and property measurements of the flexible laminate substrate were recorded as shown in Table 1.

Example 3

The polyamic acid resin solution A was prepared in the same manner as that in Example 1. Subsequently, 2.061 g of b4hb (0.9033 mmole), 1.8449 g of imd (2.7099 mmole), and 1.4108 g of dpd (0.9033 mmole) pre-dissolved in 10 g NMP as a solution was added to the polyamic acid solution A for reaction. After being completely stirred for 1 hour, the viscous polyamic acid resin solution D was obtained. The viscous polyamic acid resin solution D was cyclized in the same manner as that in Example 1, thereby forming a polyimide resin layer in a flexible laminate substrate. The composition and property measurements of the flexible laminate substrate were recorded as shown in Table 1.

Example 4

The polyamic acid resin solution A was prepared in the same manner as that in Example 1. Subsequently, 0.1891 g of b4hb (0.0828 mmole), 0.3723 g of imd (0.5469 mmole), and 0.4926 g of 1,10-phenanthroline (hereinafter pt, 0.2734 mmole) pre-dissolved in 3 g NMP as a solution was added to the polyamic acid solution A for reaction. After being completely stirred for 1 hour, the viscous polyamic acid resin solution E was obtained. The viscous polyamic acid resin solution E was cyclized in the same manner as that in Example 1, thereby forming a polyimide resin layer in a flexible laminate substrate. The composition and property measurements of the flexible laminate substrate were recorded as shown in Table 1.

Example 5

The polyamic acid resin solution A was prepared in the same manner as that in Example 1. Subsequently, 1.0206 g of b4hb (0.447 mmole), 1.035 g of imd (1.52 mmole), and 1.3377 g of pt (0.7423 mmole) pre-dissolved in 5 g NMP as a solution was added to the polyamic acid solution A for reaction. After being completely stirred for 1 hour, the viscous polyamic acid resin solution F was obtained. The viscous polyamic acid resin solution F was cyclized in the same manner as that in Example 1, thereby forming a polyimide resin layer in a flexible laminate substrate. The composition and property measurements of the flexible laminate substrate were recorded as shown in Table 1.

Example 6

The polyamic acid resin solution A was prepared in the same manner as that in Example 1. Subsequently, 2.061 g of b4hb (0.9033 mmole), 1.8449 g of imd (2.71 mmole), and 1.6278 g of pt (0.9033 mmole) pre-dissolved in 10 g NMP as a solution was added to the polyamic acid solution A for reaction. After being completely stirred for 1 hour, the viscous polyamic acid resin solution G was obtained. The viscous polyamic acid resin solution G was cyclized in the same manner as that in Example 1, thereby forming a polyimide resin layer in a flexible laminate substrate. The composition and property measurements of the flexible laminate substrate were recorded as shown in Table 1.

Example 7

The polyamic acid resin solution A was prepared in the same manner as that in Example 1. Subsequently, 0.1261 g of methyl 4-hydroxybenzoate (hereinafter m4hb, 0.0829 mmole), 0.6462 g of benzimidazole (hereinafter bimd, 0.5469 mmole), and 0.4928 g of pt (0.2734 mmole) pre-dissolved in 3 g NMP as a solution was added to the polyamic acid solution A for reaction. After being completely stirred for 1 hour, the viscous polyamic acid resin solution H was obtained. The viscous polyamic acid resin solution H was cyclized in the same manner as that in Example 1, thereby forming a polyimide resin layer in a flexible laminate substrate. The composition and property measurements of the flexible laminate substrate were recorded as shown in Table 1.

Example 8

The polyamic acid resin solution A was prepared in the same manner as that in Example 1. Subsequently, 0.6804 g of m4hb (0.4472 mmole), 1.7962 g of bimd (1.5204 mmole), and 1.3377 g of pt (0.7423 mmole) pre-dissolved in 5 g NMP as a solution was added to the polyamic acid solution A for reaction. After being completely stirred for 1 hour, the viscous polyamic acid resin solution I was obtained. The viscous polyamic acid resin solution I was cyclized in the same manner as that in Example 1, thereby forming a polyimide resin layer in a flexible laminate substrate. The composition and property measurements of the flexible laminate substrate were recorded as shown in Table 1.

Example 9

The polyamic acid resin solution A was prepared in the same manner as that in Example 1. Subsequently, 1.3744 g of m4hb (0.9033 mmole), 3.2015 g of bimd (2.7099 mmole), and 1.6278 g of pt (0.9033 mmole) pre-dissolved in 10 g NMP as a solution was added to the polyamic acid solution A for reaction. After being completely stirred for 1 hour, the viscous polyamic acid resin solution J was obtained. The viscous polyamic acid resin solution J was cyclized in the same manner as that in Example 1, thereby forming a polyimide resin layer in a flexible laminate substrate. The composition and property measurements of the flexible laminate substrate were recorded as shown in Table 1.

Comparative Example 1

The polyamic acid resin solution A was prepared in the same manner as that in Example 1. Subsequently, the polyamic acid resin solution A without any additive was evenly coated on a copper foil having a thickness of 18 μm, baked for 4 minutes at a temperature of 100° C., then baked for 8 minutes a temperature of 180° C., and then baked for 60 minutes a temperature of 350° C. to cyclize the polyamic acid resin for forming the polyimide resin. Thus, completing a flexible laminate substrate composed of the polyimide resin layer and the copper foil, having a thickness of 25 μm. The composition and property measurements of the flexible laminate substrate were recorded as shown in Table 2.

Comparative Example 2

The polyamic acid resin solution A was prepared in the same manner as that in Example 1. Subsequently, 2.0616 g of b4hb (0.9033 mmole), 2.0478 g of imd (3.007 mmole), and 2.3517 g of dpd (1.5058 mmole) pre-dissolved in 10 g NMP as a solution was added to the polyamic acid solution A for reaction. After being completely stirred for 1 hour, the viscous polyamic acid resin solution K was obtained. The viscous polyamic acid resin solution K was cyclized in the same manner as that in Example 1, thereby forming a polyimide resin layer in a flexible laminate substrate. The composition and property measurements of the flexible laminate substrate were recorded as shown in Table 2.

Comparative Example 3

The polyamic acid resin solution A was prepared in the same manner as that in Example 1. Subsequently, 6.15 g of imd (9.033 mmole) pre-dissolved in 10 g NMP as a solution was added to the polyamic acid solution A for reaction. After being completely stirred for 1 hour, the viscous polyamic acid resin solution L was obtained. The viscous polyamic acid resin solution L was cyclized in the same manner as that in Example 1, thereby forming a polyimide resin layer in a flexible laminate substrate. The composition and property measurements of the flexible laminate substrate were recorded as shown in Table 2.

Comparative Example 4

The polyamic acid resin solution A was prepared in the same manner as that in Example 1. Subsequently, 2.46 g of imd (3.6134 mmole) and 1.41 g of dpd (0.90334 mmole)

pre-dissolved in 5 g NMP as a solution was added to the polyamic acid solution A for reaction. After being completely stirred for 1 hour, the viscous polyamic acid resin solution M was obtained. The viscous polyamic acid resin solution M was cyclized in the same manner as that in Example 1, thereby forming a polyimide resin layer in a flexible laminate substrate. The composition and property measurements of the flexible laminate substrate were recorded as shown in Table 2.

Comparative Example 5

The polyamic acid resin solution A was prepared in the same manner as that in Example 1. Subsequently, 10.31 g of b4hb (4.517 mmole) pre-dissolved in 20 g NMP as a solution was added to the polyamic acid solution A for reaction. After being completely stirred for 1 hour, the viscous polyamic acid resin solution N was obtained. The viscous polyamic acid resin solution N was cyclized in the same manner as that in Example 1, thereby forming a polyimide resin layer in a flexible laminate substrate. The composition and property measurements of the flexible laminate substrate were recorded as shown in Table 2.

TABLE 1

|  | Examples | | | | |
| --- | --- | --- | --- | --- | --- |
|  | Example 1 | Example 2 | Example 3 | Example 4 | Example 5 |
| Molar ratio of polyamic acid to additives | 1:0.1 | 1:0.3 | 1:0.5 | 1:0.1 | 1:0.3 |
| Ester-phenol compound (mmole) | b4hb 0.0917 | b4hb 0.4455 | b4hb 0.9033 | b4hb 0.0828 | b4hb 0.447 |
| Imidazole compound (mmole) | imd 0.6 | imd 1.5148 | imd 2.7099 | imd 0.5469 | imd 1.52 |
| Heterocyclic aromatic amine compound (mmole) | dpd 0.3 | dpd 0.7396 | dpd 0.9033 | pt 0.2734 | pt 0.7423 |
| Cyclization temperature (° C.) | 300 | 300 | 300 | 300 | 300 |
| Cyclization period (mins) | 20 | 20 | 20 | 20 | 20 |
| Adhesive strength (lb/in) | 7.3 | 7.4 | 7.4 | 7.3 | 7.4 |
| Flat degree (mm) | 5 (good) | 2 (excellent) | 2 (excellent) | 3 (excellent) | 1 (excellent) |
| Dielectric constant | 3.6 | 3.7 | 3.7 | 3.6 | 3.7 |

TABLE 1-continued

|  | Examples | | | |
| --- | --- | --- | --- | --- |
|  | Example 6 | Example 7 | Example 8 | Example 9 |
| Molar ratio of polyamic acid to additives | 1:0.5 | 1:0.1 | 1:0.3 | 1:0.5 |
| Ester-phenol compound (mmole) | b4hb 0.9033 | m4hb 0.0829 | m4hb 0.4472 | m4hb 0.9033 |
| Imidazole compound (mmole) | imd 2.71 | bimd 0.5469 | bimd 1.5204 | bimd 2.7099 |
| Heterocyclic aromatic amine compound (mmole) | pt 0.9033 | Pt 0.2734 | Pt 0.7423 | Pt 0.9033 |
| Cyclization temperature (° C.) | 300 | 300 | 300 | 300 |
| Cyclization period (mins) | 20 | 20 | 20 | 20 |
| Adhesive strength (lb/in) | 7.4 | 7.2 | 7.4 | 7.4 |
| Flat degree (mm) | 0 (excellent) | 3 (excellent) | 1 (excellent) | 0 (excellent) |
| Dielectric constant | 3.7 | 3.6 | 3.7 | 3.7 |

TABLE 2

|  | Comparative Examples | | | | |
| --- | --- | --- | --- | --- | --- |
|  | Compa. 1 | Compa. 2 | Compa. 3 | Compa. 4 | Compa. 5 |
| Molar ratio of polyamic acid to additive(s) | 1:0 | 1:0.6 | 1:1 | 1:0.5 | 1:0.5 |
| Ester-phenol compound (mmole) | none | b4hb 0.9033 | none | none | b4hb 4.5167 |
| Imidazole compound (mmole) | none | imd 3.007 | imd 9.033 | imd 3.613 | none |
| Heterocyclic aromatic amine compound (mmole) | none | dpd 1.5058 | none | dpd 0.903 | none |
| Cyclization temperature (° C.) | 350 | 300 | 300 | 300 | 300 |
| Cyclization period (mins) | 60 | 20 | 20 | 20 | 20 |
| Adhesive strength (lb/in) | 6 | 7.4 | 6 | 4.6 | 7.8 |
| Flat degree (mm) | 80 (warped) | 2 (excellent) | 30 (warped) | 0 (excellent) | 76 (warped) |
| Dielectric constant | 3.6 | 4.3 | 4.3 | 3.7 | 3.7 |

As shown in Examples 1-9, the polyamic acid resin and the additives having a molar ratio of 1:0.1 to 1:0.5 had similar adhesive strength, flat degree, and dielectric constant. As shown in Comparative Example 1, the polyamic acid resin without any additive had poor flat degree after cyclization at a high cyclization temperature and a long cyclization period. As shown in Comparative Example 2, the overdose additives enhanced the dielectric constant of the polyimide product after the cyclization. As shown in Example 4, when the additive amount was two times that of the additive amount maximum, the additive composed of only the imidazole compound without the other two additives had problems such as low flat degree and high dielectric constant. As shown in Comparative Example 4, the additives lack of phenol-ester compound would reduce the adhesive strength of the imidazole compound. Additionally, the additive composed of only ester-phenol without the other two additives, such as Comparative Example 5, showed warping. As described above, additives with a proper ratio are important in the invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A polyamic acid resin composition, comprising:
   a polyamic acid resin; and
   an additive, wherein the polyamic acid resin and the additive have a molar ratio of 1:0.1 to 1:0.5,
   wherein the additive comprises:
   an ester-phenol compound;
   an imidazole compound; and
   a heterocyclic aromatic amine compound other than the imidazole compound;
   wherein the ester-phenol compound is benzyl 4-hydroxybenzoate, methyl 4-hydroxybenzoate, or combinations thereof;
   wherein the imidazole compound is imidazole, benzimidazole, or combinations thereof; and
   wherein the heterocyclic aromatic amine compound is 4,4'-dipyridyl, 1, 10-phenanthroline, or combinations thereof;
   wherein the polyamic acid resin and the ester-phenol compound have a molar ratio of 1:0.01 to 1:0.1;
   wherein the polyamic acid resin and the imidazole compound have a molar ratio of 1:0.06 to 1:0.3; and
   wherein the polyamic acid resin and the heterocyclic aromatic amine compound have a molar ratio of 1:0.03 to 1:0.1.

2. The polyamic acid resin composition as claimed in claim 1, wherein the polyamic acid resin has a general formula:

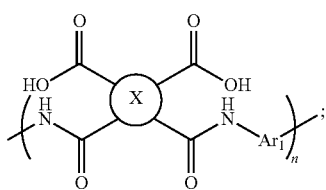

wherein X is selected from

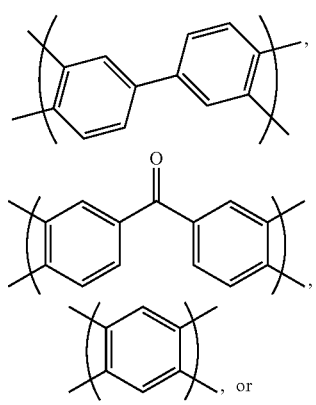

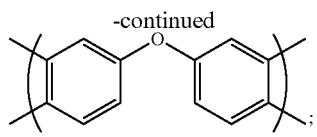

Ar1 is selected from

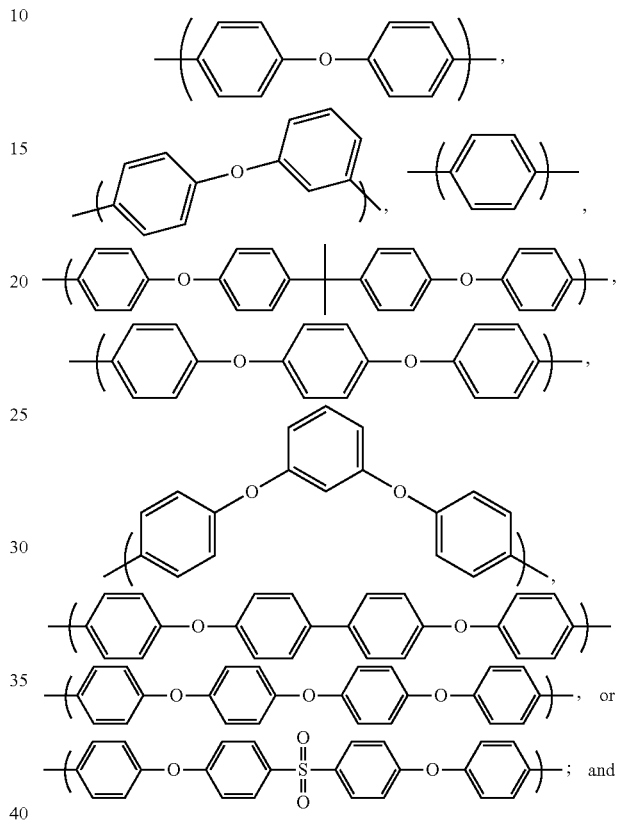

n is an integer of 50 to 3000.

3. A method for forming a polyimide resin, comprising:
   providing a polyamic acid resin composition, comprising:
   a polyamic acid resin; and
   an additive, wherein the polyamic acid resin and the additive have a molar ratio of 1:0.1 to 1:0.5,
   wherein the additive comprises:
   an ester-phenol compound;
   an imidazole compound; and
   a heterocyclic aromatic amine compound other than the imidazole compound,
   wherein the ester-phenol compound is benzyl 4-hydroxybenzoate, methyl 4-hydroxybenzoate, or combinations thereof;
   wherein the imidazole compound is imidazole, benzimidazole, or combinations thereof; and
   wherein the heterocyclic aromatic amine compound is 4,4'-dipyridyl, 1,10-phenanthroline, or combinations thereof;
   heating the polyamic acid resin composition for forming the polyimide resin,
   wherein the polyamic acid resin and the ester-phenol compound have a molar ratio of 1:0.01 to 1:0.1;
   wherein the polyamic acid resin and the imidazole compound have a molar ratio of 1:0.06 to 1:0.3; and wherein the polyamic acid resin and the heterocyclic aromatic amine compound have a molar ratio of 1:0.03 to 1:0.1.

4. The method as claimed in claim 3, wherein the step of heating the polyamic acid resin composition is performed under a temperature of 280° C. to 320° C.

5. The method as claimed in claim 3, wherein the step of heating the polyamic acid resin composition is performed for 20 minutes to 40 minutes.

6. A method of making an insulator layer, wherein the insulation layer is a polyimide resin formed according to the method recited in claim 3.

7. The method as claimed in claim 6, wherein the insulation layer is formed on a soft metal foil to complete a flexible substrate.

* * * * *